United States Patent
Oyama

(10) Patent No.: US 10,251,182 B2
(45) Date of Patent: Apr. 2, 2019

(54) TRANSMISSION CONTROLLING APPARATUS, WIRELESS COMMUNICATION SYSTEM, AND RESOURCE ALLOCATING METHOD

(71) Applicant: FUJITSU LIMITED, Kawasaki-shi, Kanagawa (JP)

(72) Inventor: Teppei Oyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/666,002

(22) Filed: Aug. 1, 2017

(65) Prior Publication Data

US 2018/0077715 A1 Mar. 15, 2018

(30) Foreign Application Priority Data

Sep. 9, 2016 (JP) .................. 2016-176575

(51) Int. Cl.
*H04W 72/08* (2009.01)
*H04B 17/336* (2015.01)
(Continued)

(52) U.S. Cl.
CPC ........ *H04W 72/082* (2013.01); *H04B 17/318* (2015.01); *H04B 17/336* (2015.01); *H04W 16/28* (2013.01); *H04W 24/02* (2013.01); *H04W 72/0406* (2013.01); *H04W 72/0453* (2013.01); *H04W 88/085* (2013.01)

(58) Field of Classification Search
CPC .......... H04L 2012/5608; H04W 84/12; H04W 88/08; H04W 88/04; H04W 88/06; H04W 84/18; H04W 72/04; H04W 76/00; H04W 36/30; H04W 36/24; H04W 52/40; H04B 7/0617; H04B 7/04

USPC .... 370/310.2, 328, 338, 329, 332, 333, 334, 370/252
See application file for complete search history.

(56) References Cited

U.S. PATENT DOCUMENTS

2010/0004017 A1* 1/2010 Kikuchi ............... H04B 7/0645 455/522
2010/0103875 A1* 4/2010 Simonsson ........... H04W 76/12 370/328

(Continued)

FOREIGN PATENT DOCUMENTS

| JP | 2012-510219 | 4/2012 |
|---|---|---|
| JP | 2015-008530 | 1/2015 |
| WO | 2010060384 | 6/2010 |

*Primary Examiner* — Brenda H Pham
(74) *Attorney, Agent, or Firm* — Fujitsu Patent Center

(57) ABSTRACT

A transmission controlling apparatus includes: a memory; a transmitting and receiving interface connected to a plurality of wireless stations each of which wirelessly transmits a signal; and a processor connected to the memory and to the transmitting and receiving interface. The processor executes a process including: calculating, for each of the wireless stations, an index indicating a magnitude of interference suffered by the signal wirelessly transmitted from the wireless station, the interference being caused by the signals wirelessly transmitted from one or more other wireless stations; determining a resource to be allocated to each of the plurality of wireless stations in accordance with the index calculated for each of the wireless stations; and transmitting transmission data to each of the plurality of wireless stations by using the determined resource.

10 Claims, 9 Drawing Sheets

(51) Int. Cl.
*H04W 24/02* (2009.01)
*H04W 72/04* (2009.01)
*H04W 16/28* (2009.01)
*H04B 17/318* (2015.01)
*H04W 88/08* (2009.01)

(56) References Cited

U.S. PATENT DOCUMENTS

2010/0127931 A1 5/2010 Rensburg et al.
2013/0279403 A1 10/2013 Takaoka et al.

* cited by examiner

TRANSMISSION CONTROLLING APPARATUS, WIRELESS COMMUNICATION SYSTEM, AND RESOURCE ALLOCATING METHOD

CROSS-REFERENCE TO RELATED APPLICATION

This application is based upon and claims the benefit of priority of the prior Japanese Patent Application No. 2016-176575, filed on Sep. 9, 2016, the entire contents of which are incorporated herein by reference.

FIELD

The embodiments discussed herein are related to a transmission controlling apparatus, a wireless communication system, and a resource allocating method.

BACKGROUND

In recent years, mobile traffic keeps increasing due to growing popularity of smartphones and the like. To address the increase in the mobile traffic, for example, studies are in progress on Massive Multi Input Multi Output (MIMO) systems in which a beam is formed by using a large number of antenna elements. When a large number of antenna elements are used, in addition to an advantageous effect where the capacity of a network is increased, another advantageous effect is also expected where it is possible to form a narrow beam and to consequently reduce interference occurring among adjacently-positioned cells.

Further, studies are also conducted on high-density distributed antenna systems in which a plurality of antenna elements connected to one baseband processing apparatus are arranged in multiple locations in a distribute manner so as to increase the capacity of the network. In such high-density distributed antenna systems, when the number of the antenna elements arranged in each location in a distributed manner is small, it is difficult to form a narrow beam in each location, and there is a possibility that interference may occur among adjacently-positioned locations. However, because all the antenna elements are connected to the one baseband processing apparatus, it is possible to reduce the interference occurring among the locations by exercising cooperative control over the antenna elements arranged in the various locations.

Patent Literature 1: Japanese Laid-open Patent Publication No. 2015-8530

Japanese National Publication of International Patent Application No. 2012-510219

Incidentally, to increase the capacity of a network while signals are transmitted from a plurality of antenna elements, mutually-different signals are transmitted simultaneously from mutually-different antenna elements. In other words, for example, in a base station apparatus adopting the Massive MIMO system, the signals transmitted from mutually-different antenna elements have a phase difference. Consequently, the signals simultaneously transmitted through the antenna elements are not the same as one another.

For this reason, in a wireless communication system in which a plurality of wireless stations each including a plurality of antenna elements are connected to one baseband processing apparatus, the number of the antenna elements usable in a transmission from each of the wireless stations may be limited in accordance with the amount of data that can be transmitted and received between the baseband processing apparatus and the wireless station. In other words, when the amount of data received from the baseband processing apparatus is large, the number of the antenna elements that are simultaneously usable by the wireless station is set to a large value. On the contrary, when the amount of data received from the baseband processing apparatus is small, the number of the antenna elements that are simultaneously usable by the wireless station is set to a small value.

In this manner, the number of the antenna elements usable by each of the wireless stations is limited in accordance with the amount of data transmitted and received between the baseband processing apparatus and the wireless station. Accordingly, there is a case where the interference among the wireless stations is not sufficiently reduced, depending on resources allocated to the wireless stations. More specifically, when not many resources are allocated to a wireless station, because the amount of data transmitted to the wireless station is small, the number of the antenna elements that are simultaneously usable is small. As a result, the wireless station is not able to form a sufficiently narrow beam. Consequently, for example, the levels of interference increase at the terminal devices other than the terminal device to which the signal is transmitted.

In particular, it is difficult to exercise cooperative control over wireless stations connected to mutually-different baseband processing apparatuses. Accordingly, there is a possibility that interference may increase among adjacently-positioned wireless stations in the vicinity of a boundary between two baseband processing apparatuses.

SUMMARY

According to an aspect of an embodiment, a transmission controlling apparatus includes: a memory; a transmitting and receiving interface connected to a plurality of wireless stations each of which wirelessly transmits a signal; and a processor connected to the memory and to the transmitting and receiving interface. The processor executes a process including: calculating, for each of the wireless stations, an index indicating a magnitude of interference suffered by the signal wirelessly transmitted from the wireless station, the interference being caused by the signals wirelessly transmitted from one or more other wireless stations; determining a resource to be allocated to each of the plurality of wireless stations in accordance with the index calculated for each of the wireless stations; and transmitting transmission data to each of the plurality of wireless stations by using the determined resource.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present disclosure is not limited by these embodiments.

[a] First Embodiment

Figure 1:
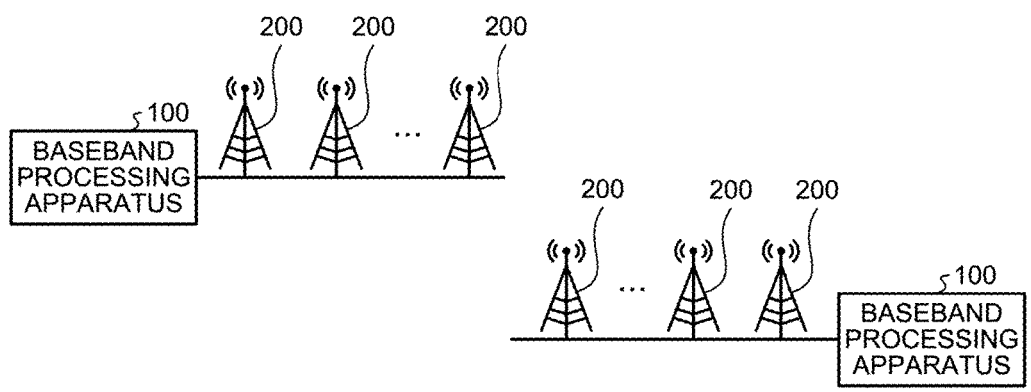
FIG. 1 is a drawing illustrating a configuration of a wireless communication system according to a first embodiment.

FIG. 1 is a drawing illustrating a configuration of a wireless communication system according to a first embodiment. As illustrated in FIG. 1, the wireless communication system includes a plurality of baseband processing apparatuses 100. A plurality of wireless stations 200 are connected to each of the baseband processing apparatuses 100. The wireless stations 200 are connected in series to the baseband processing apparatus 100 thereof. Although each of the baseband processing apparatuses 100 and the wireless stations 200 thereof are connected by a single straight line in FIG. 1, each of the baseband processing apparatuses 100 and the wireless stations 200 thereof are connected by a plurality of signal lines. Further, each of the signal lines may correspond to a different one of a plurality of antenna elements included in each wireless station 200.

Each of the baseband processing apparatuses 100 generates transmission data to be transmitted from the wireless stations 200 to terminal devices (not illustrated) and further causes the generated transmission data to be transmitted from the wireless stations 200. In this situation, the baseband processing apparatus 100 determines resources to be allocated to each of the wireless stations 200 in accordance with the level of interference occurring in the surroundings of the wireless station 200. For example, the baseband processing apparatus 100 determines the number of signal lines to be allocated to each of the wireless stations 200 and transmits data to each of the wireless stations 200 by using the allocated signal lines. With this arrangement, the baseband processing apparatus 100 is able to transmit the data in an amount corresponding to the level of interference to each of the wireless stations 200, and each of the wireless stations 200 is able to perform a wireless transmission through antenna elements of which the number corresponds to the level of interference. Specific configurations and operations of the baseband processing apparatuses 100 will be explained in detail later.

Each of the wireless stations 200 is connected to the baseband processing apparatus 100 thereof via the plurality of signal lines and includes the plurality of antenna elements. Further, each of the wireless stations 200 wirelessly transmits the data that was transmitted thereto from the baseband processing apparatus 100 through signal lines allocated thereto, by using the antenna elements corresponding to the signal lines. Further, each of the wireless stations 200 receives, from the terminal devices thereof (not illustrated), reception power information reporting a reception power level of a downlink communication line and transmits the received reception power information to the baseband processing apparatus 100 thereof.

Figure 2:
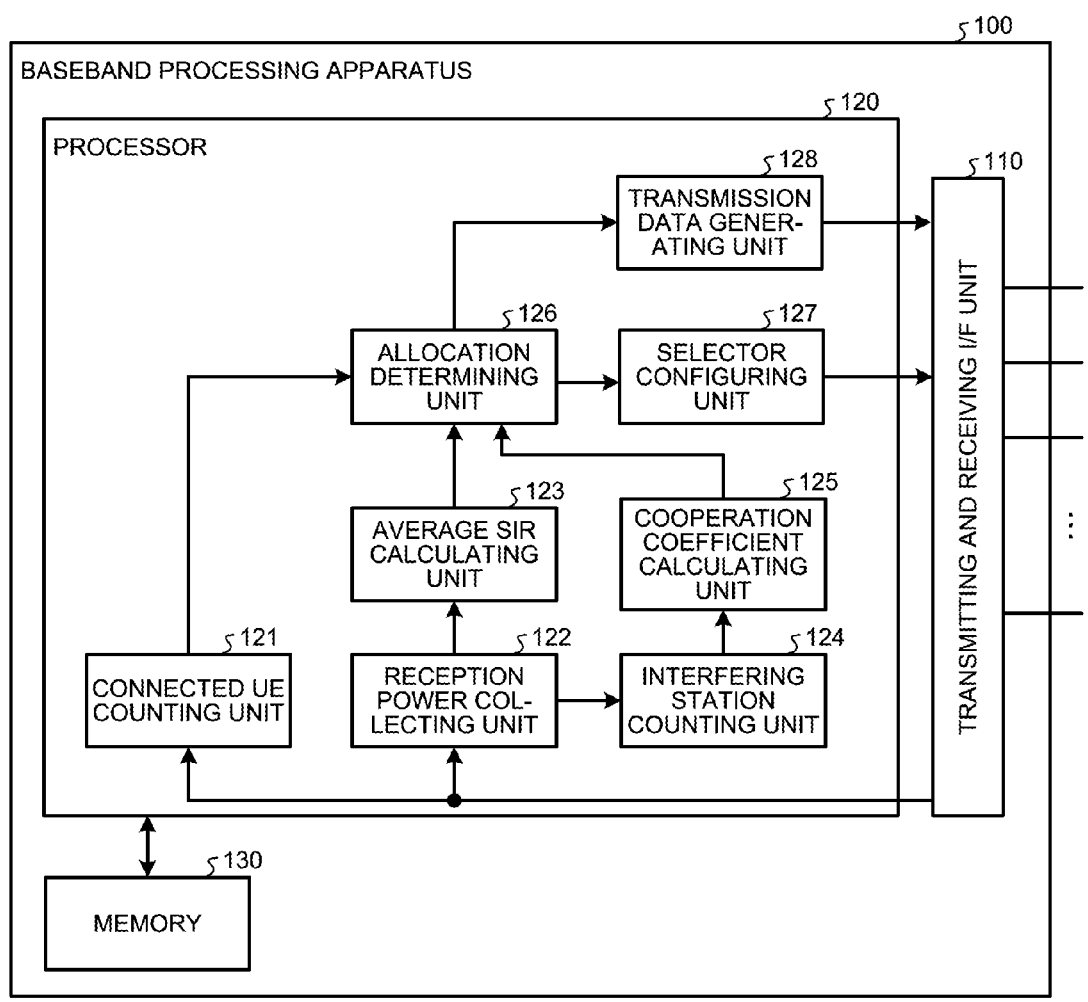
FIG. 2 is a block diagram illustrating a configuration of any of baseband processing apparatuses according to the first embodiment.

FIG. 2 is a block diagram illustrating a configuration of any of the baseband processing apparatuses 100 according to the first embodiment. The baseband processing apparatus 100 illustrated in FIG. 2 includes a transmitting and receiving interface unit (hereinafter, simply referred to as "transmitting and receiving I/F unit") 110, a processor 120, and a memory 130.

The transmitting and receiving I/F unit 110 is an interface that establishes the connections to the wireless stations 200 via the plurality of signal lines. The transmitting and receiving I/F unit 110 transmits the transmission data generated by the processor 120 to each of the wireless stations 200. In that situation, the transmitting and receiving I/F unit 110 transmits the transmission data to be transmitted from predetermined one or more of the wireless stations 200 through the signal lines allocated to these wireless station 200, in accordance with allocations of the signal lines determined by the processor 120. Further, the transmitting and receiving I/F unit 110 receives the reception power information transmitted thereto from the wireless stations 200 and outputs the reception power information to the processor 120.

The processor 120 includes, for example, a Central Processing Unit (CPU), a Field Programmable Gate Array (FPGA), a Digital Signal Processor (DSP), or the like and is configured to perform various types of processes by using the memory 130. More specifically, the processor 120 includes a connected User Equipment (UE: terminal device) counting unit 121, a reception power collecting unit 122, an average Signal to Interference Ratio (SIR) calculating unit 123, an interfering station counting unit 124, a cooperation coefficient calculating unit 125, an allocation determining unit 126, a selector configuring unit 127, and a transmission data generating unit 128.

The connected UE counting unit 121 counts the number of the terminal devices (hereinafter, "connected UEs") that are currently wirelessly communicating with each of the wireless stations 200 and notifies the allocation determining unit 126 of the number of the connected UEs of each of the wireless stations 200. The connected UE counting unit 121 is capable of obtaining the number of the connected UEs for each of the wireless stations 200 by, for example, counting the number of the terminal devices from which the reception power information was transmitted, with respect to each of the wireless stations 200. Because such a wireless station 200 that has a large number of connected UEs has a high possibility of interference occurring among the connected UEs, it is desirable for such a wireless station 200 to form a narrow beam by using a larger number of antenna elements.

On the basis of the pieces of reception power information, the reception power collecting unit 122 collects the reception power levels of the downlink communication lines of the terminal devices, for each of the sets made up of a wireless station 200 and the terminal devices thereof. In other words, the reception power collecting unit 122 acquires the pieces of reception power information each including a result of a terminal device measuring the reception power level from the wireless station 200 thereof and collects the reception power levels for each of the sets made up of a wireless station 200 and the terminal devices thereof. Accordingly, the reception power levels collected by the reception power collecting unit 122 include not only the reception power level from the wireless station 200 serving as the communication counterpart, but also interference power levels from one or more wireless stations 200 other than the communication counterpart.

The average SIR calculating unit 123 calculates an average SIR for each of the wireless stations 200, by using the reception power levels collected by the reception power collecting unit 122. More specifically, the average SIR calculating unit 123 calculates the average SIR for each of the wireless stations 200 by using Expression (1) presented below.

$$\gamma(i) = \sum_{j \in UE(i)} \frac{\sum_{k \in Nei(i)} P(i, j, k)}{P(i, j, i)} \quad (1)$$

In Expression (1), $\gamma(i)$ denotes the average SIR of wireless station #i, whereas P(i,j,k) denotes the reception power level at connected UE #(i,j) of wireless station #i from wireless station #k. Accordingly, P(i,j,i) denotes the reception power level at connected UE #k(i,j) of wireless station #i from wireless station #i. Further, UE(i) denotes a set of connected UEs #k(i,j) of wireless station #i. Nei(i) denotes a set of wireless stations in the surroundings interfering with wireless station #i.

In this manner, the average SIR calculating unit 123 calculates, as the average SIR of each of the wireless stations 200, a value obtained by totaling ratio values from the connected UEs thereof, the ratio values each indicating, with respect to a different one of the connected UEs, a ratio of interference power level to a reception power level from the wireless station 200 serving as the communication counterpart thereof. Because such a wireless station 200 that has a large average SIR value has great interference occurring among the connected UEs, it is desirable for such a wireless station 200 to form a narrow beam by using a larger number of antenna elements.

On the basis of the reception power levels collected by the reception power collecting unit 122, the interfering station counting unit 124 counts the number of other wireless stations 200 (hereinafter "interfering stations") interfering with each of the wireless stations 200. More specifically, the interfering station counting unit 124 refers to the reception power levels reported by the connected UEs of each of the wireless stations 200 and, when the reception power level from a wireless station 200 other than the communication counterpart is equal to or larger than a predetermined level, the interfering station counting unit 124 determines the wireless station 200 to be an interfering station. After that, the interfering station counting unit 124 determines one or more interfering stations with respect to each of all the connected UEs for each of the wireless stations 200 and further counts the number of the interfering stations determined in this manner.

On the basis of a result of the counts of the interfering stations obtained by the interfering station counting unit 124, the cooperation coefficient calculating unit 125 calculates, for each of the wireless stations 200, a cooperation coefficient serving as an index indicating whether or not it is possible to reduce the interference by exercising cooperative control over the other wireless stations 200. More specifically, the cooperation coefficient calculating unit 125 calculates the cooperation coefficient for each of the wireless stations 200 by using Expression (2) presented below.

$$C(i) = 1 + \frac{N_{all}(i) - N_c(i)}{N_{all}(i)} \quad (2)$$

In Expression (2), C(i) denotes the cooperation coefficient with respect to wireless station #i. $N_{all}(i)$ denotes the number of the interfering stations interfering with wireless station #i. Further, $N_c(i)$ denotes the number of such wireless stations 200 that are among the interfering stations of wireless station #i and are connected to the same baseband processing apparatus 100 as wireless station #i is.

In this manner, the cooperation coefficient calculating unit 125 calculates the cooperation coefficients in such a manner that, among the interfering stations, the larger the number of the wireless stations 200 that are not connected to the same baseband processing apparatus 100 is, the larger is the value of the cooperation coefficient. In other words, the larger the number of such interfering stations is that are not connected to the same baseband processing apparatus 100 and for which it is therefore difficult to reduce the interference by exercising the cooperative control, the larger is the value of the cooperation coefficient. For such a wireless station 200 that has a large cooperation coefficient value, because it is difficult to reduce the interference with the connected UEs by exercising the cooperative control, it is desirable for such a wireless station 200 to form a narrow beam by using a larger number of antenna elements.

On the basis of the number of the connected UEs, the average SIR, and the cooperation coefficient for each of the wireless stations 200, the allocation determining unit 126 determines the resource to be allocated to each of the wireless stations 200. More specifically, to each of the wireless stations 200, the allocation determining unit 126 allocates a plurality of signal lines connecting the baseband processing apparatus 100 to the wireless station 200. In this situation, the allocation determining unit 126 calculates a distribution index of the resources for each of the wireless stations 200 by using Expression (3) presented below.

$$R(i) = N_{UE}(i) \cdot \gamma(i) \cdot C(i) \quad (3)$$

In Expression (3), R(i) denotes a distribution index of the resources of wireless station whereas $N_{UE}(i)$ denotes the number of connected UEs #(i,j) of wireless station #i. Further, $\gamma(i)$ and C(i) denote the average SIR and the cooperation coefficient, respectively, of wireless station #i calculated by using Expressions (1) and (2) presented above.

After that, by using the calculated distribution index R(i) of the resources, the allocation determining unit 126 calculates the amount of the resources to be allocated to each of the wireless stations 200. In the present example, the allocation determining unit 126 calculates the number of the signal lines to be allocated to each of the wireless stations 200 by using Expression (4) presented below, while using the distribution index R(i).

$$N_{sig}(i) = \frac{R(i)}{\sum_{j \in P} R(j)} N_{sig\_all} \quad (4)$$

In Expression (4), $N_{sig}(i)$ denotes the number of the signal lines to be allocated to wireless station #i. $N_{sig\_all}$ denotes the total number of signal lines connecting the baseband processing apparatus 100 to the wireless stations 200. Further, P denotes a set of the wireless stations 200 connected to one baseband processing apparatus 100.

As explained above, on the basis of the distribution indices, the allocation determining unit 126 allocates a large number of signal lines to such a wireless station 200 in which interference may easily occur or in which interference has already occurred, to ensure that it is possible to transmit a large amount of transmission data from the baseband processing apparatus 100 to such a wireless station 200.

Further, after determining the number of the signal lines to be allocated to each of the wireless stations 200, the allocation determining unit 126 determines which signal lines are to be allocated to which wireless station 200. In other words, the allocation determining unit 126 performs an optimization process to determine allocations of the signal lines to the wireless stations 200 that will yield a large throughput in the wireless communication system, by defining, among the plurality of antenna elements included in each of the wireless stations 200, which signal lines connected to which antenna elements shall be allocated to the wireless station 200. By performing the optimization process, the allocation determining unit 126 determines the signal lines to be allocated to each of the wireless stations 200.

The selector configuring unit 127 generates configuration information used for configuring a selector included in each of the wireless stations 200, in accordance with the allocations of the signal lines determined by the allocation determining unit 126 and further transmits the generated configuration information to each of the wireless stations 200 via the transmitting and receiving I/F unit 110. As a result of the configuring of the selector included in each of the wireless stations 200 with the use of the configuration information, each of the wireless stations 200 is to receive the transmission data transmitted thereto from the baseband processing apparatus 100 through the signal lines allocated thereto.

The transmission data generating unit 128 generates the transmission data to be transmitted from each of the wireless stations 200 to the terminal devices thereof. In this situation, by referring to the allocation of the signal lines to each of the wireless stations 200 determined by the allocation determining unit 126, the transmission data generating unit 128 controls a beam used by each of the wireless stations 200 to wirelessly communicate with the terminal devices to which the transmission data is to be transmitted. In other words, the transmission data generating unit 128 applies a weight to the data to be transmitted through the signal lines, so as to form beams oriented in the directions toward the terminal devices to which the transmission data is to be transmitted. After that, the transmission data generating unit 128 outputs the transmission data to be transmitted through the signal lines, to the transmitting and receiving I/F unit 110.

The memory 130 includes a Random Access Memory (RAM), a Read-Only Memory (ROM), or the like, for example, and is configured to store therein various types of information used by processes performed by the processor 120.

Figure 3:
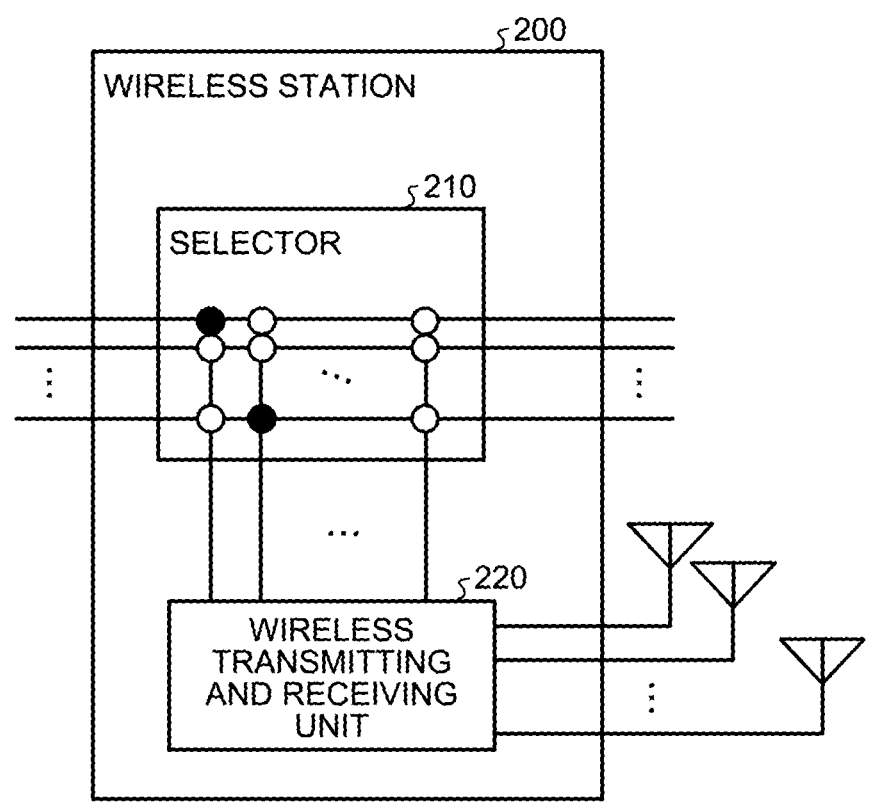
FIG. 3 is a block diagram illustrating a configuration of any of wireless stations according to the first embodiment.

FIG. 3 is a block diagram illustrating a configuration of any of the wireless stations 200 according to the first embodiment. The wireless station 200 illustrated in FIG. 3 includes a selector 210 and a wireless transmitting and receiving unit 220.

The selector 210 connects to either the baseband processing apparatus 100 or another wireless station 200 through a plurality of signal lines and is configured to select the signal lines connecting to the wireless station 200 thereof according to the configuration information transmitted thereto from the baseband processing apparatus 100. More specifically, the selector 210 includes switches capable of connecting and disconnecting the signal lines to and from the antenna elements provided in the wireless station 200 thereof. The selector 210 establishes connections between the signal lines and the antenna elements according to the configuration information. In the example illustrated in FIG. 3, the switches indicated with black dots connect the signal lines to the corresponding antenna elements, whereas the switches indicated with white dots are not connecting the signal lines to the corresponding antenna elements. In this manner, because the selector 210 is able to connect and disconnects the signal lines to and from the antenna elements by using the switches, it is possible to supply the antenna elements with the transmission data that is transferred through appropriate signal lines. It is therefore possible to form beams configured by the baseband processing apparatuses 100.

The wireless transmitting and receiving unit 220 wirelessly performs a wireless transmitting process on the transmission data output through the signal lines via the selector 210 and further transmits the processed transmission data through the antenna elements connected to the respective signal lines. In other words, the wireless transmitting and receiving unit 220 performs the wireless transmitting process such as, for example, a Digital/Analog (D/A) conversion or an up-converting process on the transmission data and further wirelessly transmits the processed transmission data through the antenna elements. Further, the wireless transmitting and receiving unit 220 receives signals transferred through uplink communication lines including the reception power information or the like transmitted thereto from the terminal devices. After performing a predetermined wireless receiving process on the received signals, the wireless transmitting and receiving unit 220 transmits the processed received signals to the baseband processing apparatus 100.

Figure 4:
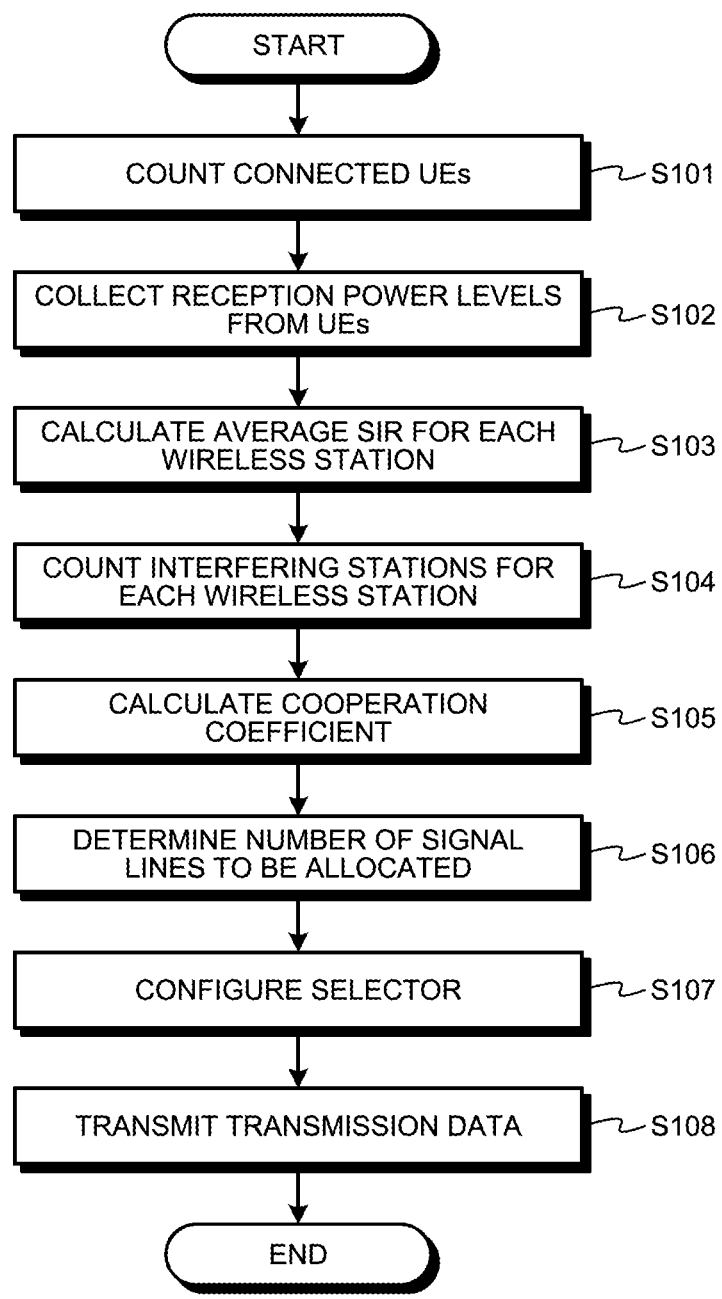
FIG. 4 is a flowchart illustrating a resource allocating method according to the first embodiment.

Next, a resource allocating method implemented by the baseband processing apparatus 100 configured as described above will be explained, with reference to the flowchart in FIG. 4.

The connected UEs of each of the wireless stations 200 measure the reception power levels of the downlink communication lines and each send a report about the reception power information indicating the reception power levels of the wireless station 200 to the wireless station 200 serving as the communication counterpart. The reception power information is transmitted from each of the wireless stations 200 to the baseband processing apparatus 100 and is received by the transmitting and receiving I/F unit 110. Further, the reception power information is output to the connected UE counting unit 121 and to the reception power collecting unit 122 included in the processor 120.

When the reception power information has been output to the connected UE counting unit 121, the number of the connected UEs is counted for each of the wireless stations 200 (step S101). In other words, for each of the wireless stations 200, the connected UE counting unit 121 counts the number of the terminal devices that reported the reception power information, as the number of the connected UEs. Because such a wireless station 200 that has a large number of connected UEs has a high possibility of interference occurring among the connected UEs, it is desirable for such a wireless station 200 to form a narrow beam by using a larger number of antenna elements. The process of counting the number of the connected UEs performed by the connected UE counting unit 121 may be implemented by using signals transferred through the uplink communication lines other than the reception power information.

Further, when the reception power information has been output to the reception power collecting unit 122, the reception power levels of the downlink communication lines are collected for each of the sets made up of a wireless station 200 and the terminal devices thereof (step S102). In other words, because the terminal devices measure the reception power levels from a number of wireless stations 200 including wireless stations 200 other than the communication counterpart, the reception power collecting unit 122 collects, on the basis of the reception power information, the reception power levels of the downlink communication lines of the terminal devices, for each of the sets made up of a wireless station 200 and the terminal devices thereof.

The collected reception power levels are provided, as a notification, for the average SIR calculating unit 123, so that the average SIR calculating unit 123 calculates an average SIR for each of the wireless stations 200 (step S103). More specifically, by using Expression (1) presented above, the average SIR calculating unit 123 calculates, as the average SIR of each of the wireless stations 200, a value obtained by totaling ratio values from the connected UEs thereof, the ratio values each indicating, with respect to a different one of the connected UEs, a ratio of interference power level to a reception power level from the wireless station 200 serving as the communication counterpart thereof. Because such a wireless station 200 that has a large average SIR value has great interference occurring among the connected UEs, it is desirable for such a wireless station 200 to form a narrow beam by using a larger number of antenna elements.

Further, the reception power levels collected by the reception power collecting unit 122 are also provided, as a notification, for the interfering station counting unit 124, so that the interfering station counting unit 124 counts the number of the interfering stations for each of the wireless stations 200 (step S104). In other words, with respect to any given wireless station 200, the interfering station counting unit 124 counts the number of such wireless stations 200 that are positioned in the surroundings of the given wireless station 200 and from which a reception power level equal to or higher than a predetermined level is measured by the connected UEs of the given wireless station 200. When the number of the interfering stations has been counted for each of the wireless stations 200, the cooperation coefficient calculating unit 125 calculates a cooperation coefficient for each of the wireless stations 200 (step S105). More specifically, by using Expression (2) presented above, the cooperation coefficients are calculated in such a manner that, among the interfering stations, the larger the number of the wireless stations 200 that are not connected to the same baseband processing apparatus 100 is, the larger is the value of the cooperation coefficient. For such a wireless station 200 that has a large cooperation coefficient value, because it is difficult to reduce the interference with the connected UEs by exercising the cooperative control, it is desirable for such a wireless station 200 to form a narrow beam by using a larger number of antenna elements.

When the number of the connected UEs, the average SIR, and the cooperation coefficient have been obtained for each of the wireless stations 200 in this manner, the allocation determining unit 126 determines the number of the signal lines to be allocated to each of the wireless stations 200 (step S106). More specifically, by using Expression (3) presented above, the allocation determining unit 126 calculates a distribution index of the resources for each of the wireless stations 200, on the basis of the number of the connected UEs, the average SIR, and the cooperation coefficient of each of the wireless stations 200. The distribution indices are calculated in such a manner that such a wireless station 200 in which interference may easily occur or in which interference has already occurred has a larger distribution index value. After that, the number of the signal lines to be allocated to each of the wireless stations 200 is determined in accordance with the distribution index. Accordingly, to such a wireless station 200 in which interference may easily occur or in which interference has already occurred, a larger number of signal lines are allocated, so that it is possible to form a beam by using a larger number of antenna elements. As a result, with respect to the connected UEs of such a wireless station 200 in which interference may easily occur or in which interference has already occurred, a narrow beam is formed. It is therefore possible to inhibit an increase in the interference with other wireless stations 200.

When the number of the signal lines to be allocated to each of the wireless stations 200 has been determined, the selector configuring unit 127 generates the configuration information used for configuring the selector 210 in each of the wireless stations 200, and each of the selectors 210 is thus configured (step S107). In other words, the configuration information is transmitted to each of the wireless stations 200. In each of the wireless stations 200, as a result of the selector 210 being configured according to the configuration information, as many signal lines as the number allocated to the wireless station 200 are each connected to a corresponding one of the antenna elements.

At this time, only the number of the signal lines to be allocated to each of the wireless stations 200 is determined, and it has not been determined which signal lines are to be allocated. Consequently, the signal lines are allocated to each of the wireless stations 200 in accordance with a predetermined initial setting. The allocations of the signal lines may be changed, for example, through the optimization process performed to optimize the antenna elements used in each of the wireless stations 200. The optimization process for the antenna elements will be explained in detail later.

When the configuring of the selector 210 has been completed in each of the wireless stations 200, the transmission data generating unit 128 generates the transmission data to be wirelessly transmitted from each of the wireless stations 200 to the terminal devices thereof. In this situation, in accordance with the allocations of the signal lines to the wireless stations 200, pieces of transmission data to be transferred by the signal lines are weighted, so as to form beams oriented in the directions toward the terminal devices. The pieces of transmission data corresponding to the respective signal lines are transmitted from the transmitting and receiving I/F unit 110 to the wireless stations 200 to which the signal lines are allocated (step S108). Further, from each of the wireless stations 200, the transmission data is wirelessly transmitted through the antenna elements corresponding to the signal lines. As a result, the beam is formed in accordance with the degree of interference at each of the wireless stations 200. It is therefore possible to inhibit an increase in the interference.

Figure 5:
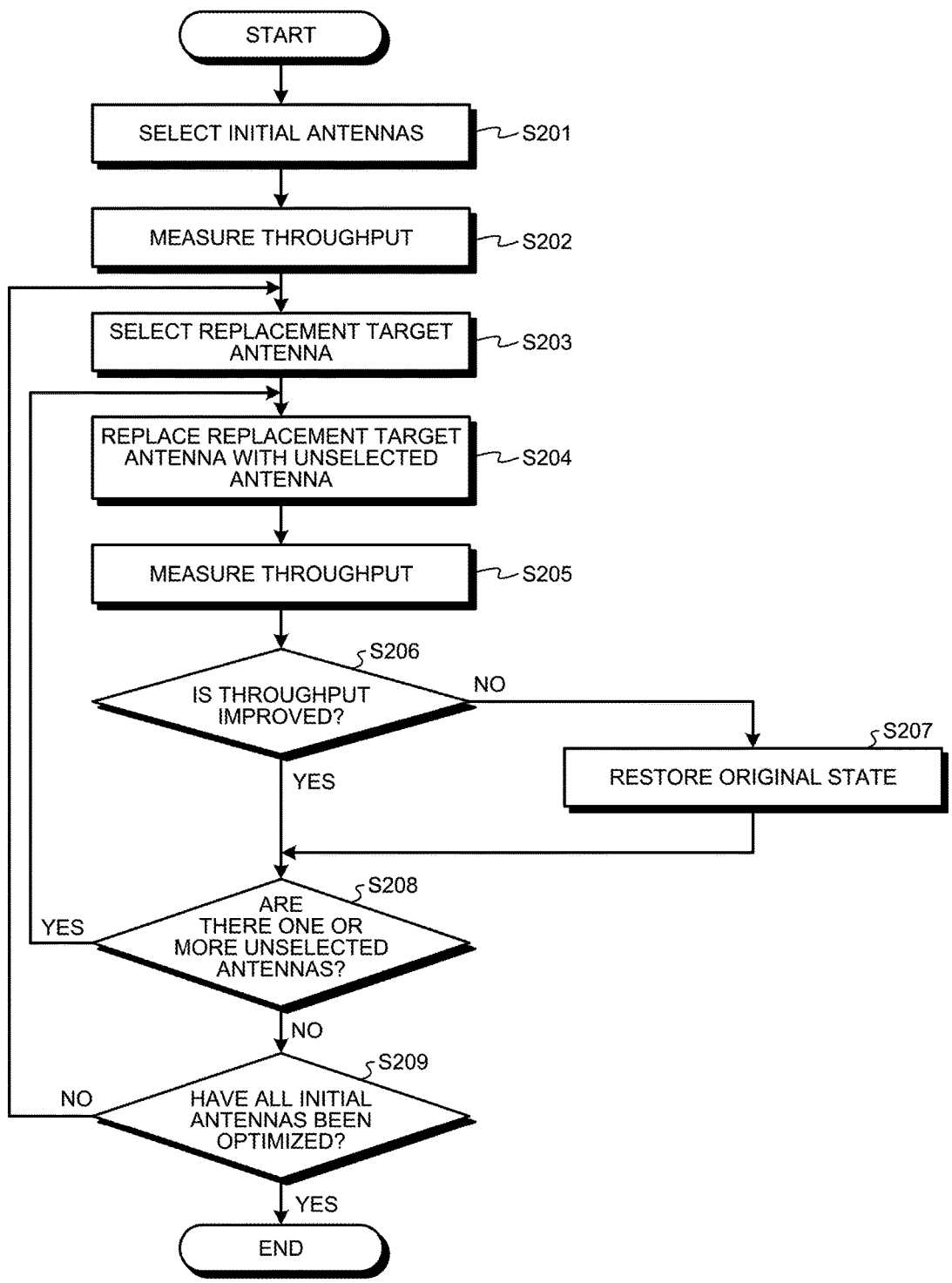
FIG. 5 is a flowchart illustrating an antenna optimization process.

Next, the optimization process will be explained with reference to the flowchart in FIG. 5, in which, after the number of the signal lines to be allocated to each of the wireless stations 200 is determined, it is determined which signal lines connected to which antenna elements are to be allocated. The optimization process illustrated in FIG. 5 is performed by the allocation determining unit 126, after the signal lines corresponding to the antenna elements in the initial setting are allocated to each of the wireless stations 200.

First, when the number of the signal lines to be allocated to each of the wireless stations 200 has been determined, as many antenna elements as the number of the allocated signal lines are selected as initial antennas for each of the wireless stations 200 (step S201). The initial antennas may be arbitrary antenna elements. For example, it is acceptable to select, as the initial antennas, antenna elements of which the number is equal to the number of the signal lines allocated to each of the wireless stations 200 and which are positioned at equal intervals. When the initial antennas have been selected, the switches in the selector 210 are turned on and off in each of the wireless stations 200, so that the signal lines and the initial antennas are connected to each other.

Further, each of the wireless stations 200 wirelessly communicates with the terminal devices thereof by using the initial antennas, and the allocation determining unit 126 measures a throughput of the wireless communication (step S202). The measured throughput is temporality stored into the memory 130 or the like. After that, one antenna element is selected from among the initial antennas as a replacement target antenna (step S203). When the replacement target antenna has been selected, the replacement target antenna is replaced with one of unselected antenna elements, which had not been selected as the initial antennas (step S204). In other words, the switches in the selector 210 are turned on and off so that a signal line and the replacement target antenna are disconnected from each other, whereas the signal line and the one unselected antenna elements are connected to each other. The antenna element that has newly been connected to the signal line will thereafter serve as a replacement target antenna.

After the replacement target antenna has been changed in this manner, the allocation determining unit 126 measures a throughput again (step S205). The measured throughput is compared with the throughput with the initial antennas stored in the memory 130 or the like. It is judged whether or not the throughput is improved (step S206). As a result of the judgment, when the throughput is not improved (step S206: No), the connections between the signal lines and the antenna elements are restored to the original state (step S207). In other words, in the present example, the signal lines and the initial antennas are reconnected, and also, the replacement target antenna is again the initially-selected antenna element.

On the contrary, when the throughput is improved by replacing the replacement target antenna (step S206: Yes), the connections between the signal lines and the antenna elements are maintained in the current state. Further, it is judged whether or not the wireless station 200 still has one or more unselected antenna elements that have not yet replaced the replacement target antenna (step S208). When there are one or more unselected antennas (step S208: Yes), the replacement target antenna is replaced by one of the unselected antennas (step S204). After that, a throughput is measure every time a different one of the unselected antennas replaces the replacement target antenna. The replacement target antenna is kept replaced or is restored to the original state as appropriate until all the antenna elements are sequentially selected. As a result, such an antenna element that maximizes the throughput becomes the replacement target antenna eventually. The optimization process has thus been completed for the replacement target antenna that was initially selected.

When all the antenna elements have each replaced the replacement target antenna, and there is no longer any unselected antenna (step S208: No), it is judged whether or not the optimization process has been completed for each of all the initial antennas (step S209). As a result of the judgment, when there are one or more initial antennas for which the optimization process has not yet been completed (step S209: No), one of the initial antennas for which the optimization process has not yet been completed is selected as a replacement target antenna (step S203). After that, in the same manner as described above, the optimization process is performed also on the newly-selected replacement target antenna. In this manner, the optimization process is performed on each of the initial antennas. When the optimization process has been completed on all the initial antennas (step S209: Yes), it means that the signal lines and the antenna elements are connected to each other while maximizing the throughput.

As explained above, according to the first embodiment, on the basis of the number of the connected UEs, the average SIR, and the cooperation coefficient of each of the wireless stations, a larger number of signal lines are allocated to such a wireless station that tends to suffer from great interference caused by other wireless stations. Consequently, it is possible to transmit a large amount of data from the baseband processing apparatus to such a wireless station that tends to suffer from great interference. As a result, such a wireless station that tends to suffer from great interference is able to form a narrow beam while using a large number of antenna elements. It is therefore possible to inhibit an increase in the interference among the wireless stations.

[b] Second Embodiment

Characteristics of a second embodiment lie in that a frequency band is allocated as a resource to each of the wireless stations.

Because the configuration of a wireless communication system according to the second embodiment is similar to the configuration in the first embodiment (FIG. 1), the explanation thereof will be omitted. In the second embodiment, the processor 120 included in the baseband processing apparatus 100 is different from that in the first embodiment.

Figure 6:
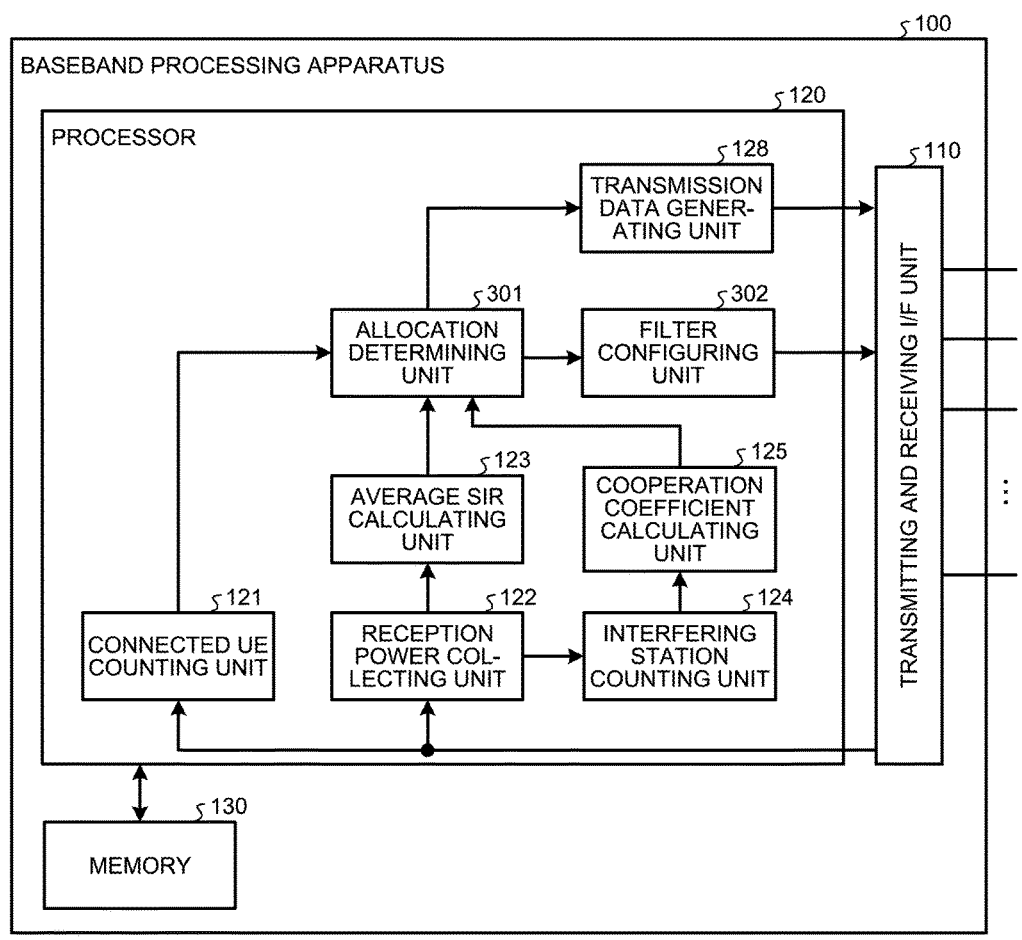
FIG. 6 is a block diagram illustrating a configuration of any of baseband processing apparatuses according to a second embodiment.

FIG. 6 is a block diagram illustrating a configuration of any of the baseband processing apparatuses 100 according to the second embodiment. In FIG. 6, some of the constituent elements that are the same as those in FIG. 2 are referred to by using the same reference characters, and the explanation thereof will be omitted. Similarly to the baseband processing apparatus 100 illustrated in FIG. 2, the baseband processing apparatus 100 illustrated in FIG. 6 includes the transmitting and receiving I/F unit 110, the processor 120, and the memory 130. Further, the processor 120 illustrated in FIG. 6 includes an allocation determining unit 301 and a filter configuring unit 302, in place of the allocation determining unit 126 and the selector configuring unit 127 included in the processor 120 illustrated in FIG. 2.

On the basis of the number of the connected UEs, the average SIR, and the cooperation coefficient for each of the wireless stations 200, the allocation determining unit 301 determines resources to be allocated to each of the wireless stations 200. More specifically, the allocation determining unit 301 determines a frequency band to be allocated to a signal transmitted from the baseband processing apparatus 100 to each of the wireless stations 200. In this situation, similarly to the first embodiment, the allocation determining unit 301 calculates the distribution index R(i) in Expression (3) presented above and further calculates the frequency band to be allocated to each of the wireless stations 200 by using the calculated distribution index R(i) of the resources. In this situation, the allocation determining unit 301 calculates the frequency band to be allocated to each of the wireless stations 200 by using Expression (5) presented below, while using the distribution index R(i).

$$B_{sig}(i) = \frac{R(i)}{\sum_{j \in P} R(j)} B_{sig\_all} \quad (5)$$

In Expression (5), $B_{sig}(i)$ denotes the frequency band to be allocated to wireless station whereas $B_{sig\_all}$ denotes the entire frequency band of the signals transmitted from the baseband processing apparatus 100. Further, P denotes a set of the wireless stations 200 connected to one baseband processing apparatus 100.

In this manner, on the basis of the distribution indices, the allocation determining unit 301 allocates a large frequency band to such a wireless station 200 in which interference may easily occur or in which interference has already occurred, so that it is possible to transmit a large amount of transmission data from the baseband processing apparatus 100 to such a wireless station 200.

The filter configuring unit 302 generates configuration information used for configuring a filter included in each of the wireless stations 200, in accordance with the allocations of the frequency bands determined by the allocation determining unit 301, and further transmits the generated configuration information to each of the wireless stations 200 via the transmitting and receiving I/F unit 110. Because the filter included in each of the wireless stations 200 is configured with a passing band according to the configuration information, each of the wireless stations 200 is able to receive a signal in the frequency band allocated thereto.

Figure 7:
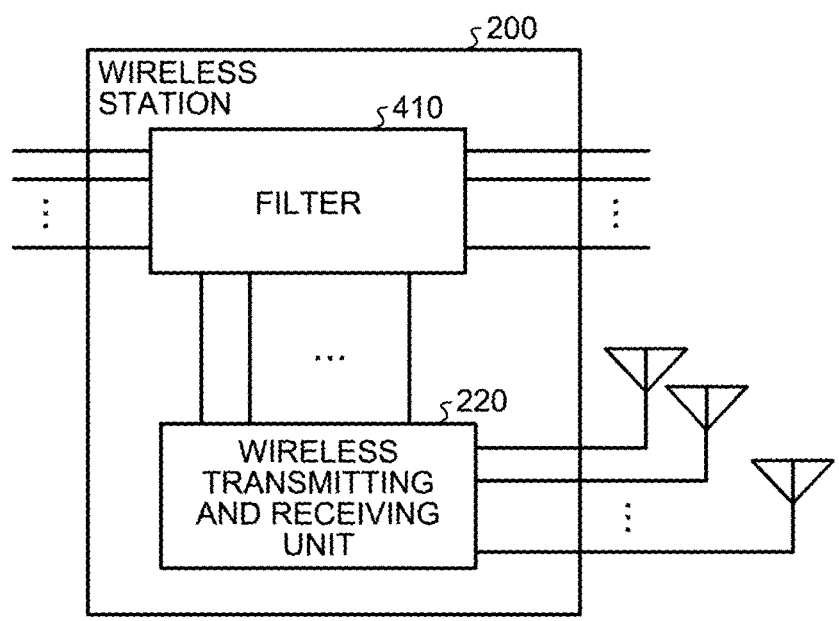
FIG. 7 is a block diagram illustrating a configuration of any of wireless stations according to the second embodiment.

FIG. 7 is a block diagram illustrating a configuration of any of the wireless stations 200 according to the second embodiment. In FIG. 7, some of the constituent elements that are the same as those in FIG. 3 are referred to by using the same reference characters, and the explanation thereof will be omitted. The wireless station 200 illustrated in FIG. 7 includes a filter 410 in place of the selector 210 included in the wireless station 200 illustrated in FIG. 3.

The filter 410 connects to the baseband processing apparatus 100 or to another wireless station 200 via signal lines and is configured with the passing band in accordance with the configuration information transmitted thereto from the baseband processing apparatus 100. More specifically, with respect to the signal transmitted thereto from the baseband processing apparatus 100, the filter 410 passes such a part of the signal that is in the frequency band allocated to the wireless station 200 thereof, onto the wireless transmitting and receiving unit 220.

Figure 8:
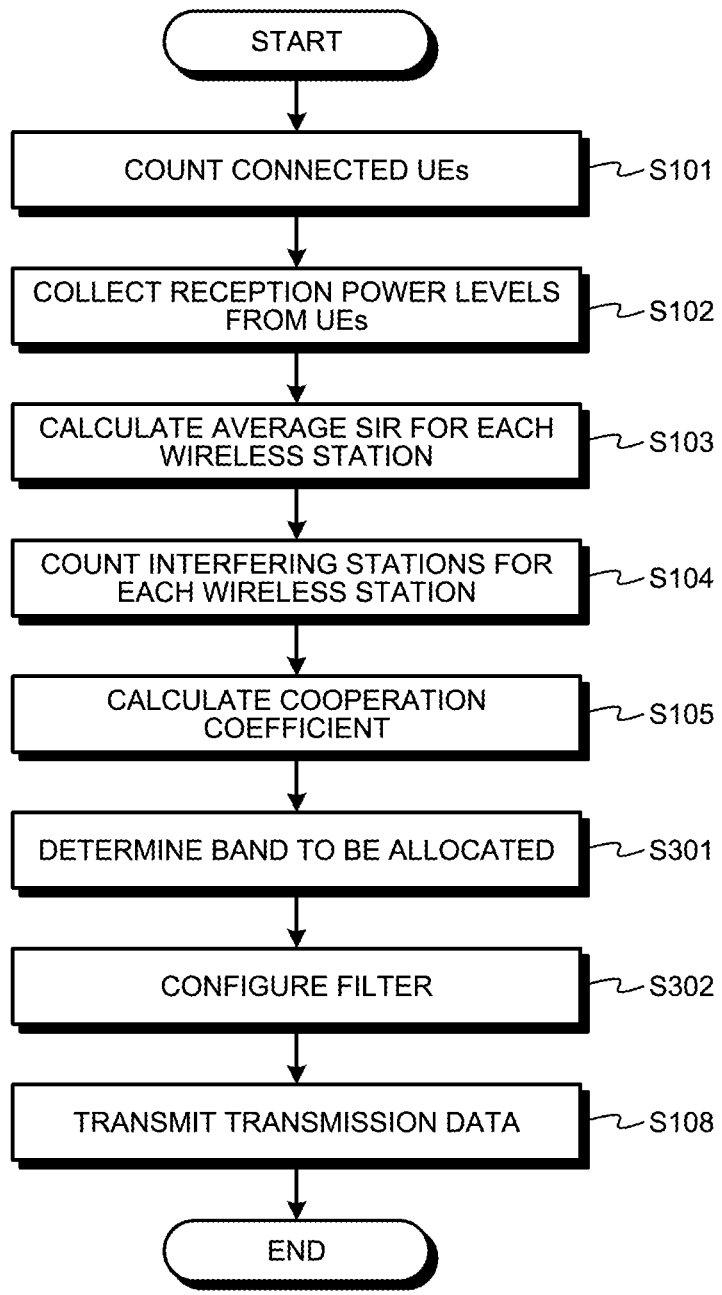
FIG. 8 is a flowchart illustrating a resource allocating method according to the second embodiment.

Next, a resource allocating method implemented by the baseband processing apparatus 100 configured as described above will be explained, with reference to the flowchart in FIG. 8. In FIG. 8, some of the procedures that are the same as those in FIG. 4 are referred to by using the same reference numerals, and detailed explanations thereof will be omitted.

Similarly to the first embodiment, the connected UEs of each of the wireless stations 200 measure the reception power levels of the downlink communication lines and each send a report about the reception power information to the wireless station 200 serving as the communication counterpart. The reception power information is transmitted from each of the wireless stations 200 to the baseband processing apparatus 100 and is received by the transmitting and receiving I/F unit 110. After that, the reception power information is output to the connected UE counting unit 121 and the reception power collecting unit 122 included in the processor 120.

When the reception power information has been output to the connected UE counting unit 121, the number of the connected UEs is counted for each of the wireless stations 200 (step S101). In other words, for each of the wireless stations 200, the connected UE counting unit 121 counts the number of the terminal devices that reported the reception power information, as the number of the connected UEs. Further, when the reception power information has been output to the reception power collecting unit 122, the reception power levels of the downlink communication lines are collected for each of the sets made up of a wireless station 200 and the terminal devices thereof (step S102).

The collected reception power levels are provided, as a notification, for the average SIR calculating unit 123, so that the average SIR calculating unit 123 calculates an average SIR for each of the wireless stations 200 (step S103). Further, the reception power levels collected by the reception power collecting unit 122 are also provided, as a notification, for the interfering station counting unit 124, so that the interfering station counting unit 124 counts the number of the interfering stations for each of the wireless stations 200 (step S104). When the number of the interfering stations has been counted for each of the wireless stations 200, the cooperation coefficient calculating unit 125 calculates a cooperation coefficient for each of the wireless stations 200 (step S105).

When the number of the connected UEs, the average SIR, and the cooperation coefficient have been obtained for each of the wireless stations 200 in this manner, the allocation determining unit 301 determines a frequency band to be allocated to each of the wireless stations 200 (step S301). More specifically, the allocation determining unit 301 calculates a distribution index of the resources for each of the wireless stations 200 by using Expression (3) presented above, on the basis of the number of the connected UEs, the average SIR, and the cooperation coefficient of each of the wireless stations 200. The distribution indices are calculated in such a manner that such a wireless station 200 in which interference may easily occur or in which interference has already occurred has a larger distribution index value. Further, the frequency band to be allocated to each of the wireless stations 200 is determined in accordance with the distribution index. Accordingly, a larger frequency band is allocated to such a wireless station 200 in which interference may easily occur or in which interference has already occurred. It is therefore possible to form a beam by using a larger number of antenna elements. As a result, with respect to such a wireless station 200 in which interference may easily occur or in which interference has already occurred, a narrow beam is formed for the connected UEs thereof. It is therefore possible to inhibit an increase in the interference with other wireless stations 200.

When the frequency band to be allocated to each of the wireless stations 200 has been determined, the filter configuring unit 302 generates the configuration information used for configuring the filter 410 included in each of the wireless stations 200, each of the filters 410 is thus configured (step S302). In other words, as a result of the configuration information being transmitted to each of the wireless stations 200 and the passing band of the filter 410 being configured according to the configuration information at each of the wireless stations 200, such a part of the signal transmitted from the baseband processing apparatus 100 that is in the frequency band allocated to each of the wireless stations 200 is received.

When the configuring of the filter 410 has been completed in each of the wireless stations 200, the transmission data generating unit 128 generates the transmission data to be wirelessly transmitted from each of the wireless stations 200 to the terminal devices thereof. In this situation, in accordance with the allocations of the frequency bands to the wireless stations 200, pieces of transmission data to be transmitted to the wireless stations 200 are arranged in mutually-different frequency bands. Each of the pieces of transmission data that are arranged in the mutually-different frequency bands is transmitted from the transmitting and receiving I/F unit 110 to a corresponding one of the wireless stations 200 (step S108).

Figure 9:
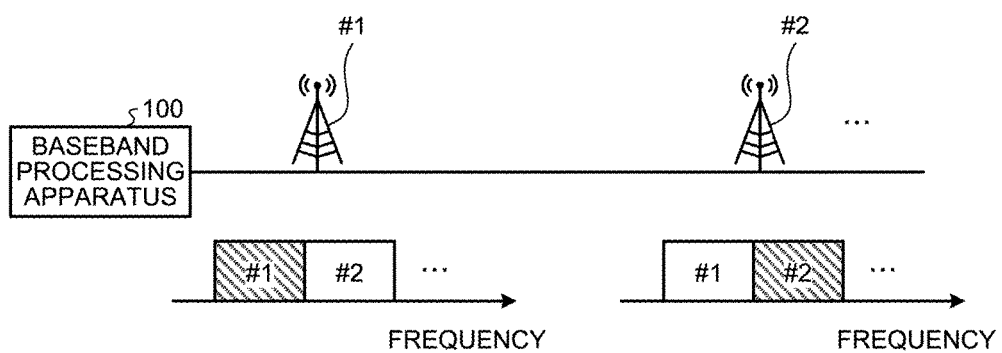
FIG. 9 is a drawing illustrating a specific example of a band allocating process.

More specifically, as illustrated in FIG. 9, for example, when band #1 is allocated to wireless station #1, while band #2 is allocated to wireless station #2, the baseband processing apparatus 100 transmits a signal including bands #1 and #2. Further, because the filter 410 included in wireless station #1 is configured to use band #1 as a passing band thereof, wireless station #1 receives a piece of transmission data that is addressed thereto and is arranged in band #1. In contrast, because the filter 410 included in wireless station #2 is configured to use band #2 as a passing band thereof, wireless station #2 receives a piece of transmission data that is addressed thereto and is arranged in band #2. Further, the pieces of transmission data are wirelessly transmitted by the respective wireless stations (wireless station #1 and wireless station #2) through the antenna elements of which the number corresponds to the frequency band. Consequently, a beam is formed in accordance with the degree of interference at each of the wireless stations. It is therefore possible to inhibit an increase in the interference.

As explained above, according to the second embodiment, on the basis of the number of the connected UEs, the average SIR, and the cooperation coefficient of each of the wireless stations, a larger frequency band is allocated to such a wireless station that tends to suffer from great interference caused by one or more other wireless stations. Consequently, it is possible to transmit a large amount of data from the baseband processing apparatus to such a wireless station that tends to suffer from great interference. As a result, such a wireless station that tends to suffer from great interference is able to form a narrow beam by using a large number of antenna elements. It is therefore possible to inhibit an increase in the interference among the wireless stations.

It is also possible to describe the resource allocating method explained in any of the embodiments above as a computer-executable program. In that situation, the program may be stored in a computer-readable recording medium so as to be introduced to a computer. Examples of the computer-readable recording medium include a portable recording medium such as a Compact Disk Read-Only Memory (CD-ROM), a Digital Versatile Disk (DVD), or a Universal Serial Bus (USB) memory and a semiconductor memory such as a flash memory, for instance.

By using at least one embodiment of the transmission controlling apparatus, the wireless communication system, and the resource allocating method of the present disclosure, an advantageous effect is achieved where it is possible to inhibit an increase in the interference among the wireless stations.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission controlling apparatus comprising:
   a transmitting and receiving interface connected to a plurality of wireless stations each of which wirelessly transmits a signal; and
   a processor connected to the memory and to the transmitting and receiving interface, wherein
   the processor executes a process including:
      calculating, for each of the wireless stations, an index indicating a magnitude of interference suffered by the signal wirelessly transmitted from the wireless station, the interference being caused by the signals wirelessly transmitted from one or more other wireless stations;
      determining a resource to be allocated to each of the plurality of wireless stations in accordance with the index calculated for each of the wireless stations; and
      transmitting transmission data to each of the plurality of wireless stations by using the determined resource, wherein
   the determining includes allocating signal lines in such a manner that the greater interference a wireless station is indicated to suffer from by the calculated index, the larger number of signal lines are allocated to the wireless station, from among a plurality of signal lines connecting the transmitting and receiving interface to the wireless station.

2. The transmission controlling apparatus according to claim 1, wherein the calculating includes calculating the index on a basis of a number of terminal devices connected to each of the wireless stations.

3. The transmission controlling apparatus according to claim 1, wherein the calculating includes calculating the index on a basis of an average of reception quality levels of signals received by terminal devices connected to each of the plurality of wireless stations from the wireless station.

4. The transmission controlling apparatus according to claim 1, wherein the calculating includes
   counting a number of interfering stations that cause interference in the signal wirelessly transmitted from each of the wireless stations, and
   calculating the index on a basis of a number of wireless stations that are among the counted interfering stations and are not connected to the transmitting and receiving interface.

5. A transmission controlling apparatus comprising:
   a transmitting and receiving interface connected to a plurality of wireless stations each of which wirelessly transmits a signal; and
   a processor connected to the memory and to the transmitting and receiving interface, wherein
   the processor executes a process including:
      calculating, for each of the wireless stations, an index indicating a magnitude of interference suffered by the signal wirelessly transmitted from the wireless station, the interference being caused by the signals wirelessly transmitted from one or more other wireless stations;

determining a resource to be allocated to each of the plurality of wireless stations in accordance with the index calculated for each of the wireless stations; and transmitting transmission data to each of the plurality of wireless stations by using the determined resource, wherein the determining includes allocating frequency bands in such a manner that the greater interference a wireless station is indicated to suffer from by the calculated index, the larger frequency band is allocated to the wireless station, out of a frequency band of the signal transmitted from the transmitting and receiving interface to the wireless station.

6. The transmission controlling apparatus according to claim 5, wherein the calculating includes calculating the index on a basis of a number of terminal devices connected to each of the wireless stations.

7. The transmission controlling apparatus according to claim 5, wherein the calculating includes calculating the index on a basis of an average of reception quality levels of signals received by terminal devices connected to each of the plurality of wireless stations from the wireless station.

8. The transmission controlling apparatus according to claim 5, wherein the calculating includes counting a number of interfering stations that cause interference in the signal wirelessly transmitted from each of the wireless stations, and calculating the index on a basis of a number of wireless stations that are among the counted interfering stations and are not connected to the transmitting and receiving interface.

9. A wireless communication system including a plurality of wireless stations each of which wirelessly transmits a signal and a transmission controlling apparatus connected to the plurality of wireless stations, wherein the transmission controlling apparatus comprises:

a transmitting and receiving interface connected to the plurality of wireless stations; and a processor connected to the memory and to the transmitting and receiving interface, and the processor executes a process including:

calculating, for each of the wireless stations, an index indicating a magnitude of interference suffered by the signal wirelessly transmitted from the wireless station, the interference being caused by the signals wirelessly transmitted from one or more other wireless stations;

determining a resource to be allocated to each of the plurality of wireless stations in accordance with the index calculated for each of the wireless stations; and transmitting transmission data to each of the plurality of wireless stations by using the determined resource, wherein the determining includes allocating signal lines in such a manner that the greater interference a wireless station is indicated to suffer from by the calculated index, the larger number of signal lines are allocated to the wireless station, from among a plurality of signal lines connecting the transmitting and receiving interface to the wireless station.

10. A resource allocating method implemented by a transmission controlling apparatus connected to a plurality of wireless stations each of which wirelessly transmits a signal, the resource allocating method comprising:

calculating, for each of the wireless stations, an index indicating a magnitude of interference suffered by the signal wirelessly transmitted from the wireless station, by a processor, the interference being caused by the signals wirelessly transmitted from one or more other wireless stations;

determining a resource to be allocated to each of the plurality of wireless stations in accordance with the index calculated for each of the wireless stations, by the processor; and transmitting transmission data to each of the plurality of wireless stations by using the determined resource, by the processor, wherein the determining includes allocating signal lines in such a manner that the greater interference a wireless station is indicated to suffer from by the calculated index, the larger number of signal lines are allocated to the wireless station, from among a plurality of signal lines connecting the transmitting and receiving interface to the wireless station.

* * * * *